United States Patent [19]

Lorraine

[11] Patent Number: 5,894,861
[45] Date of Patent: Apr. 20, 1999

[54] DAMPER DRY ICE CHARGE

[75] Inventor: Jack R. Lorraine, Newport News, Va.

[73] Assignee: Siemens Automotive Corporation, Auburn Hills, Mich.

[21] Appl. No.: 09/065,375

[22] Filed: Apr. 23, 1998

[51] Int. Cl.⁶ .................................................. F16L 55/04
[52] U.S. Cl. ............................ 138/30; 138/26; 220/721
[58] Field of Search .............................. 138/30, 31, 26, 138/141; 220/720, 721

[56]        References Cited

U.S. PATENT DOCUMENTS

| | | | |
|---|---|---|---|
| 3,477,473 | 11/1969 | Henry-Biabaud | 138/30 |
| 3,672,402 | 6/1972 | Bloemer . | |
| 4,092,017 | 5/1978 | Urushiyama et al. | 138/30 X |
| 4,186,776 | 2/1980 | Burton | 138/30 |
| 4,191,028 | 3/1980 | Audet et al. | 62/259 |
| 4,514,151 | 4/1985 | Anders et al. | 138/30 X |
| 4,556,087 | 12/1985 | Casilli . | |
| 4,615,320 | 10/1986 | Fehrenbach et al. | 138/30 X |
| 4,911,204 | 3/1990 | Martin | 138/30 |
| 5,129,427 | 7/1992 | White et al. | 138/30 |
| 5,374,169 | 12/1994 | Talaski . | |
| 5,542,453 | 8/1996 | Gabas | 138/30 |
| 5,771,936 | 6/1998 | Sasaki et al. | 138/31 |

*Primary Examiner*—Patrick Brinson

[57]              ABSTRACT

A damper device has a sealed damper chamber defined by a flexible diaphragm and an upper cap. The damper chamber is filled with a pressurizing agent that creates a pressurized condition in the damper chamber by a phase transformation to the gaseous state from a solid or liquid state. To form the pressurized damper, the pressurizing agent is placed in the upper cap of the damper chamber in a solid or liquid state. The diaphragm is then positioned across the opening of the upper case and sealed in position, as for example by crimping the edges of the diaphragm between the upper cup and the lower base of the damper. As the solid or liquid pressurizing agent transforms to a gas, the pressure in the damper chamber increases to a predetermined level.

8 Claims, 1 Drawing Sheet

DAMPER DRY ICE CHARGE

FIELD OF THE INVENTION

The present invention relates to a damper for a fuel system of an internal combustion engine, and more particularly to a pressurized damper.

BACKGROUND OF THE INVENTION

Various types of dampers have been proposed for use in the fuel lines of internal combustion engines for reducing pressure pulsations in the fuel rail. A common form of such dampers includes a diaphragm which separates the fuel from a compressible damper chamber. The compressive characteristic of the damper chamber is typically achieved by filling the damper chamber with a compressible gas. The compressible gas is generally either atmospheric air that is trapped when the damper chamber is sealed or is a gas introduced into the damper chamber through a valve prior to sealing the valve. When gas is introduced into the damper chamber through a valve, pressurized gas can be used to produce superatmospheric pressure in the damping chamber. Having pressurized gas in the damper chamber enables the damper to more effectively damp larger pulsations which may occur in the fuel line. However, the need for a pressure valve complicates the design and structure of the damper, making the device more expensive to manufacture and more complicated to use. These and other disadvantages of the prior art are overcome by the present invention described below.

SUMMARY OF THE INVENTION

A damper is provided having a sealed damper chamber defined by a flexible diaphragm and an upper cap. The damper chamber is filled with a pressurizing agent that creates a pressurized condition in the damper chamber by a phase transformation to the gaseous state from a solid or liquid state. To form the pressurized damper, the pressurizing agent is placed in the upper cap of the damper chamber in a solid or liquid state, depending on the material being used. The diaphragm is then positioned across the opening of the upper case and sealed in position, as for example by crimping the edges of the diaphragm between the upper cup and the lower base of the damper. As the pressurizing agent transforms to a gas, the pressure in the damper chamber increases to a predetermined level.

Use of pressurizing agent that obtains the desired pressure level through a phase transformation rather than by after-assembly introduction of pressurized gas permits the pressurization all types of damper chambers, including chambers that do not have gas valves. Thus, no modification of the damper design or structure is required. In addition, the method of introduction of the solid or liquid into the upper cup is simple, since it only requires placement of a desired amount of pressurizing agent in the damper chamber prior to sealing the chamber.

DETAILED DESCRIPTION OF THE INVENTION

Figure 1:
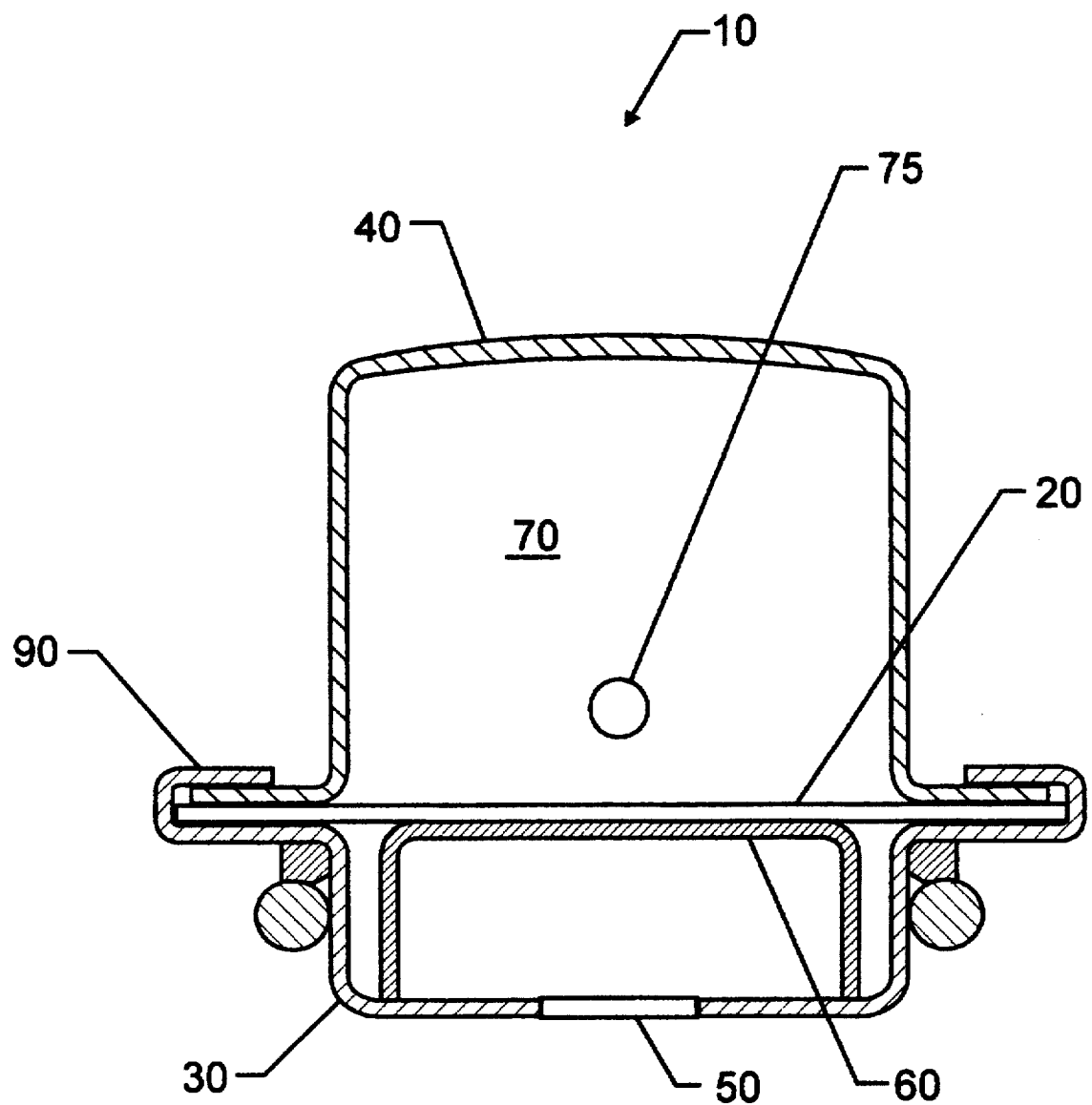
FIG. 1 is a cross section view of a damper according to the present invention.

As shown in FIG. 1, a preferred embodiment of the invention is provided wherein a damper 10 has a diaphragm 20 sealed between a lower base 30 and an upper cap 40. The lower base 30 has a fuel passage 50 to allow fuel to communicate with the diaphragm 20. A diaphragm support 60 may be positioned in the lower base 30 to support the diaphragm 20. The diaphragm 20 and upper cap 40 form a sealed damper chamber 70 having a solid or liquid pressurizing agent 75. Under the operating conditions of the fuel system, the pressurizing agent is a pressurized gas which acts to damp pressure pulsations which occur in the fuel line (not shown). No mechanical spring is required in this type of damper since the gas pressure in the damper chamber acts as a "spring". The presence of pressurized gas in the damper chamber 70 is particularly effective when it is used to dampen large pulsations that occur in high pressure applications. A specific pressurized state in the damper chamber 70 is obtained by placing a predetermined amount of pressurizing agent 75 in the upper cap 40 during assembly of the damper components. A particularly suitable pressurizing agent 75 is solid $CO_2$ ("dry ice"), which can be placed in the upper cap 40 in solid form, but which will vaporize after the damper chamber 70 is sealed to produce a desired pressurized state within the damper chamber 70. The diaphragm 20 is then placed across the cap opening and sealed in place by positioning the lower base 30 against the diaphragm 20 and crimping the flanges 90 of the lower base 30 about the peripheral edge of the upper cap 40. The diaphragm 20 should be flexible under the operating conditions in the fuel line, and should be nonpermeable to both the pressurized gas and the fuel.

The pressure obtained in the damper chamber 70 is established by controlling the amount of dry ice placed in the chamber 70. After assembly of the damper 10, pressure calibration changes within the chamber 70 can be made by changing the trapped volume, as for example, by denting the upper cap 40. If necessary, the pressure inside the damper chamber 70 may be adjusted to equal the fuel pressure established by the pressure regulator (not shown), so that the diaphragm 20 remains in a neutral position, i.e., is unstretched, over the operating temperature range of the fuel in the fuel line. A given volume of solid or liquid pressurizing agent 75 will yield a specific defined pressure for a given volume of damper chamber 20. The amount of pressurizing agent 75 required for a given set of operating conditions is calculated by using the Ideal Gas equation:

$$PV=mRT;$$

or $$m=PV/RT;$$

where: m is mass, P is absolute operating pressure, V is damper chamber 70 volume, R is the gas constant, and T is absolute operating temperature. There will be a partial pressure contribution from any air that is trapped in the damper chamber 70 during assembly.

During assembly of the damper components, the time between placement of the pressurizing agent 75 and the sealing of the damper chamber 70 should be minimized to ensure that the amount of vaporization of the pressurizing agent 75 is minimized; thus, ensuring that the actual pressure in the damper chamber 70 is as close as possible to the desired and calculated operating pressure.

Although a preferred embodiment of the invention has been illustrated and described, it should be understood that principles of the invention may be embodied in other ways. For example, although solid $CO_2$ is particularly suitable as a pressurizing agent, other solid or fluid materials such as liquid nitrogen or oxygen, ammonia, or carbon tetrafluoride, as well as reactionary mixtures of two or more components, can be used that retain their solid or fluid form long enough for assembly of the sealed damper chamber, and which remain in gaseous form over the operating temperature and pressure range to which the damper is exposed. Although the damper will be disabled if the pressure and/or temperature drive the pressurizing agent back to the solid or fluid state, it is expected that such pressures and/or temperatures will be out of the normal operating range of automotive fuel systems.

Although the damper has been illustrated as having a lower base and an upper cap, the damper can be any known enclosure or housing in which a diaphragm separates a first sealed chamber from a second chamber that is in fluid communication with fuel. By using a pressurizing agent, high pressures can be obtained in the damper chamber without the need to have valves in the upper cap to introduce a pressurized gas. This simplifies the cap structure and retains the integrity of the cap structure. However, it should be understood that dampers having such valves or openings can also be used with a pressurizing agent to obtain a desired operating pressure within the damper.

The size of the damper can be varied; and, the desired pressure can be obtained by adjusting the amount of added pressurizing agent. In addition, the operating pressure in the damper obtained by use of a pressuring agent can be supplemented by assembling and sealing the damper chamber in a pressurized environment.

What is claimed is:

1. A pressure damping device comprising:
    an enclosure having
        a first chamber,
        a second chamber having an opening to receive fluid having pressure fluctuations,
        a flexible diaphragm separating the first and second chambers to form the sealed first chamber, and
        a pressurizing agent in the first chamber, the pressurizing agent being responsive to pressure or temperature or both to undergo a phase transformation to a gas, thereby increasing the pressure in the first chamber.

2. The device of claim 1, wherein the pressurizing agent is solid $CO_2$.

3. The device of claim 2, wherein the first chamber is a cup member, the second chamber is a cup member, and the flexible diaphragm is sealingly connected between the first and second chambers.

4. A pressure damping device comprising:
    an enclosure having
        a first chamber,
        a second chamber having an opening to receive fluid having pressure fluctuations,
        a diaphram means separating the first and second chambers to form a sealed first chamber, and
        a pressurizing means in the first chamber, the pressuring means being responsive to pressure or temperature or both to increase the pressure in the first chamber;
    wherein the pressurizing means is solid $CO_2$.

5. The pressure damping device of claim 4, wherein the first chamber is a cup member, the second chamber is a cup member, and the flexible diaphragm is sealingly connected between the first and second chambers.

6. A method of forming a pressure damping device comprising the steps of:
    a) providing an enclosure;
    b) placing a pressurizing agent in a first portion of the enclosure; and
    c) sealing the first portion of the enclosure with a flexible diaphragm, the flexible diaphragm further defining a second portion of the enclosure having an opening to receive fluid having pressure fluctuations, wherein the pressurizing agent is responsive to pressure or temperature or both to undergo a phase transformation to a gas, thereby increasing the pressure in the first portion.

7. The pressure damping device of claim 6, wherein the pressurizing agent is solid $CO_2$.

8. The method of claim 7, wherein the first portion of the enclosure is a cup member and the second portion of the enclosure is a cup member.

* * * * *